(12) United States Patent
Carson et al.

(10) Patent No.: US 10,976,776 B2
(45) Date of Patent: *Apr. 13, 2021

(54) APPARATUS FOR MOUNTING A PLURALITY OF MONITORS HAVING ADJUSTABLE DISTANCE TO A VIEWER

(71) Applicant: Xybix Systems, Inc., Littleton, CO (US)

(72) Inventors: Barry Carson, Highlands Ranch, CO (US); David R. Carson, Larkspur, CO (US); Kenneth R. Carson, Centennial, CO (US)

(73) Assignee: Xybix Systems, Inc., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,683

(22) Filed: Sep. 8, 2020

(65) Prior Publication Data
US 2020/0401188 A1 Dec. 24, 2020

Related U.S. Application Data

(63) Continuation of application No. 16/102,199, filed on Aug. 13, 2018, now Pat. No. 10,768,663.

(60) Provisional application No. 62/544,569, filed on Aug. 11, 2017.

(51) Int. Cl.
*G06F 1/16* (2006.01)
*F16M 11/04* (2006.01)
*B60R 11/02* (2006.01)
*F16M 13/02* (2006.01)

(52) U.S. Cl.
CPC ........ *G06F 1/1624* (2013.01); *B60R 11/0235* (2013.01); *F16M 11/041* (2013.01); *F16M 13/02* (2013.01); *G06F 1/1601* (2013.01); *G06F 1/1647* (2013.01)

(58) Field of Classification Search
USPC ............ 108/50.01, 50.02; 312/196; 248/128, 248/159, 416
See application file for complete search history.

(56) References Cited

U.S. PATENT DOCUMENTS 10,768,663 B2 * 9/2020 Carson ................ B60R 11/0235

* cited by examiner

Primary Examiner — Alfred J Wujciak
(74) Attorney, Agent, or Firm — Sheridan Ross P.C.

(57) ABSTRACT

An apparatus and method for mounting a plurality of display monitors is disclosed, wherein the apparatus is provided at a user's desk or workstation. The apparatus can be easily moved toward and away from the user such that all the monitors mounted on the apparatus move in unison in the direction indicated by the user. Accordingly, the apparatus accommodates the visual preferences of virtually all users of the desk or workstation so that eye and skeletal muscle fatigue are reduced.

14 Claims, 9 Drawing Sheets

APPARATUS FOR MOUNTING A PLURALITY OF MONITORS HAVING ADJUSTABLE DISTANCE TO A VIEWER

CROSS-REFERENCE TO RELATED APPLICATION

This application is a continuation of U.S. patent application Ser. No. 16/102,199, filed 13 Aug. 2018, which claims the benefit of U.S. provisional patent application 62/544,569, filed 11 Aug. 2017, the entireties of both of which are hereby incorporated by reference.

FIELD OF THE INVENTION

The present invention is directed toward a method of providing a mechanism to the computer user for the effortless manual or automated adjustment of LCD computer monitors to enable proper focal lengths and view angles for individual or multiple users at a single workstation.

BACKGROUND OF THE INVENTION

Individual computer users typically have differing visual and physical requirements for optimal viewing of computer screens. Inappropriate focal lengths or distance from the eye to the computer screen can cause visual fatigue, headaches or other symptoms of eye strain. Improper monitor heights can result in muscular strain and fatigue as well. An ability to quickly and effortlessly achieve proper adjustment of monitors has the potential to reduce eye strain and muscular fatigue resulting in higher productivity and reduced worker's compensation claims as well as lowered levels of absenteeism related to these physical problems associated with intensive computer usage.

Attempts have been made to alleviate these problems using "monitor arms"—an articulating segmented arm which has a joint between two or more sections allowing the arm to be moved forward and back directly in line with the user's line of sight. A ball mount is typically attached to the end of the outermost arm which allows the attached monitor to be adjusted for pan and tilt. Such "monitor arms" typically require a friction type adjustment mechanism at each joint to prevent unwanted movement and a rigid mounting method which will prevent tipping forward due to the weight of the arm and attached monitor. Some versions of monitor arms include an up/down feature to adjust for proper view angles and these must be "balanced" to the weight of the attached monitor.

The above noted attempts to solve the problems of eye strain and related musculoskeletal injuries are offset by the difficulty of making proper and periodic adjustments to maintain the friction connections at the joints. The nature of the articulated arm design prevents the free and easy movement forward and back needed to make proper focal length adjustments. Adjustment requires the user to "fight" the tendency of the monitor arm to move sideways rather than directly forward or back. Arms with height adjustment require precise balancing to match the weight of the attached monitor. The tendency of most users, if adjustment is difficult, is to do nothing which negates the value of the investment in monitor arms and puts users at a higher risk of visual and musculoskeletal problems.

The increasing prevalence of multiple monitor workstations used by a plurality of different users simply multiplies the degree of difficulty involved in making the proper adjustments and lessens the likelihood of consistent compliance with health, safety and ergonomic adjustment guidelines promulgated by the Occupational Health and Safety Administration (OSHA), the American National Standards Institute (ANSI)/Human Factors and Ergonomics Society (HFES) in the United States and the International Organization for Standardization (ISO) in Europe and other countries of the world. Moreover, providing multiple monitors on articulated arms can be even more difficult for users to appropriately position due to size and weight of the resulting configuration. Additionally, configuring such a multiple monitor articulated arm so that adequate range of arm movement is provided requires supporting/mounting the arm on a wall, floor, or a rigid work surface due to the substantial torque resulting from extending the arm.

U.S. Pat. No. 8,596,599 ("the '599 patent"), which represents the state of the art at the time of the present invention and is incorporated herein by reference in its entirety, discloses an apparatus for mounting a plurality of monitors that allows a user to "stack" a second row of monitors above a first row of monitors when many monitors are required. Although the solution of the '599 patent is adequate to mount many monitors, it also carries several potential drawbacks. By way of non-limiting example, it may frequently be the case that a user may wish to have a substantially larger number of monitors, e.g. four or more, in a lower row than in an upper row, e.g. one or two; in such a case, the top row of the frame structure of the '599 patent protrudes horizontally beyond the upper row of monitors and creates an aesthetically displeasing, "industrial" appearance. In addition, the substantial forces exerted on the lower portion of the frame structure by the weight of monitors, especially larger monitors, may cause the lower portion to twist or bend undesirably, which may force the lower row of monitors out of a desired position or even cause damage to the frame structure.

Accordingly, it is desirable to have a multiple monitor support apparatus that can be provided at a user's desk or workstation, wherein the apparatus can slidably glide over the desktop of the desk or workstation in manner that: (a) addresses the above-identified health, safety and ergonomic adjustment guidelines, (b) does so with reduced adjustments by the user(s), and (c) does so with substantially no torque that articulated arms generate when extended. It is further desirable for such an apparatus to provide a "clean," aesthetically pleasing appearance for any configuration of monitors and to provide improved strength and stability of a lower portion of the apparatus. These apparatuses described hereinbelow provides these benefits as well as others.

SUMMARY OF THE INVENTION

It is one aspect of the present invention to provide a computer monitor mounting apparatus for mounting a plurality of monitors, comprising a plurality of monitors; a platform having at least one guide attached thereto, wherein the guide also contacts an upwardly facing surface so that the guide maintains the platform on a predetermined path along the upwardly facing surface when the platform moves on the upwardly facing surface, the platform including a plurality of spaced apart subplatforms; a frame extending above the platform and attached thereto for moving with the platform when the platform moves along the predetermined path, the frame providing mountings supporting the plurality of the monitors above the platform; wherein the guide includes portions that move relative to one another within a space between the upwardly facing surface and the subplatforms; one or more wheels or rollers for rolling the platform on the upwardly facing surface, wherein the wheels or rollers move over the upwardly facing surface for at least a portion of a travel extent for the wheels or rollers, each wheel or roller having an extent that rotatably contacts the upwardly facing surface when the platform moves along the predetermined path; and a connector for connecting the subplatforms together, wherein the connector provides an interior that is: (i) between at least two of the subplatforms, and (ii) between an upper boundary of the interior and the upwardly facing surface, wherein the interior provides storage space on the upwardly facing surface, the interior having a height above the upwardly facing surface of at least three times a height of the space between the upwardly facing surface and the subplatforms, wherein the interior is effective for storing one or more items without interfering with movement of the platform on the predetermined path, wherein the frame comprises a substantially horizontal lower rail and first and second vertical post segments, the substantially horizontal lower rail having a depth of about 40 millimeters and a height of about 80 millimeters, the first vertical post segment having a height of about 8.75" and interconnecting into a bottom channel of the substantially horizontal lower rail, the second vertical post segment having a height of about 20" and a first mounting affixed thereto, the first mounting supporting a monitor at a height of about 17.5" above the platform.

In embodiments, the at least one guide may include a portion that is fixedly attached to the upwardly facing surface.

In embodiments, the at least one guide may telescope during movement of the monitor mounting apparatus over the upwardly facing surface.

In embodiments, the at least one guide may retract and extend during movement of the monitor mounting apparatus over the upwardly facing surface.

In embodiments, the platform may have a range of movement along the predetermined path of at least 10 inches.

In embodiments, the platform may have a range of movement along the predetermined path of less than 20 inches.

In embodiments, at least one of the mountings may include a predetermined monitor mount hole pattern.

In embodiments, for each monitor of at least some of the monitors, a corresponding one of the mountings may attach the monitor to a horizontal rail of the frame, wherein the corresponding mounting provides a horizontal range of rotation of at least 60 degrees for the monitor.

In embodiments, the monitors may be provided along an arc of the frame such that for a corresponding display for each of at least two-thirds of the monitors, and for at least one position facing the displays, a distance between (i) the at least one position and (ii) a center of the corresponding display varies by no more than about 5% from a distance between the at least one position and a center of the corresponding display for each of the other monitors of the at least two-thirds of the monitors.

In embodiments, the frame may include at least one substantially horizontal rail wherein at least one of the mountings is horizontally slidable along the rail.

In embodiments, the substantially horizontal lower rail may support at least one of the mountings thereon, and may further include an adjustment plate for providing a vertical adjustment of the mounting on the rail, the plate secured between the rail and the at least one mounting, the plate secured separately to each of the rail and the at least one mounting.

In embodiments, at least one of the mountings may include a first rotational member, wherein when a corresponding one of the monitors is attached to the at least one mounting, the first rotational member provides a first rotation range for the corresponding monitor.

In embodiments, the upwardly facing surface may include a substantially horizontal desktop.

In embodiments, at least the substantially horizontal lower rail and the first vertical post segment may be extruded aluminum alloy beam components.

In embodiments, the second vertical post segment may have a second mounting affixed thereto, the second mounting supporting a monitor at a height of about 8.75" above the platform.

In embodiments, the frame may further comprise a third vertical post segment having a height of about 20" and a horizontal monitor support beam extending between the second and third vertical post segments, the horizontal monitor support beam having a mounting supporting a monitor affixed thereto.

Further description of advantages, benefits, and patentable aspects of the present disclosure will become evident from the accompanying drawings and description hereinbelow. All novel aspects of the disclosure, regardless of whether they are explicitly mentioned in this section, are considered subject matter for patent protection either singly or in combination with other aspects of this disclosure. Accordingly, such novel aspects disclosed hereinbelow and/or in the drawings that may be omitted from, or less than fully described in, this section are fully incorporated herein by reference into this section. Particularly, all of the below claims are fully incorporated herein by reference into this Summary section.

DETAILED DESCRIPTION OF THE INVENTION

Figure 1:
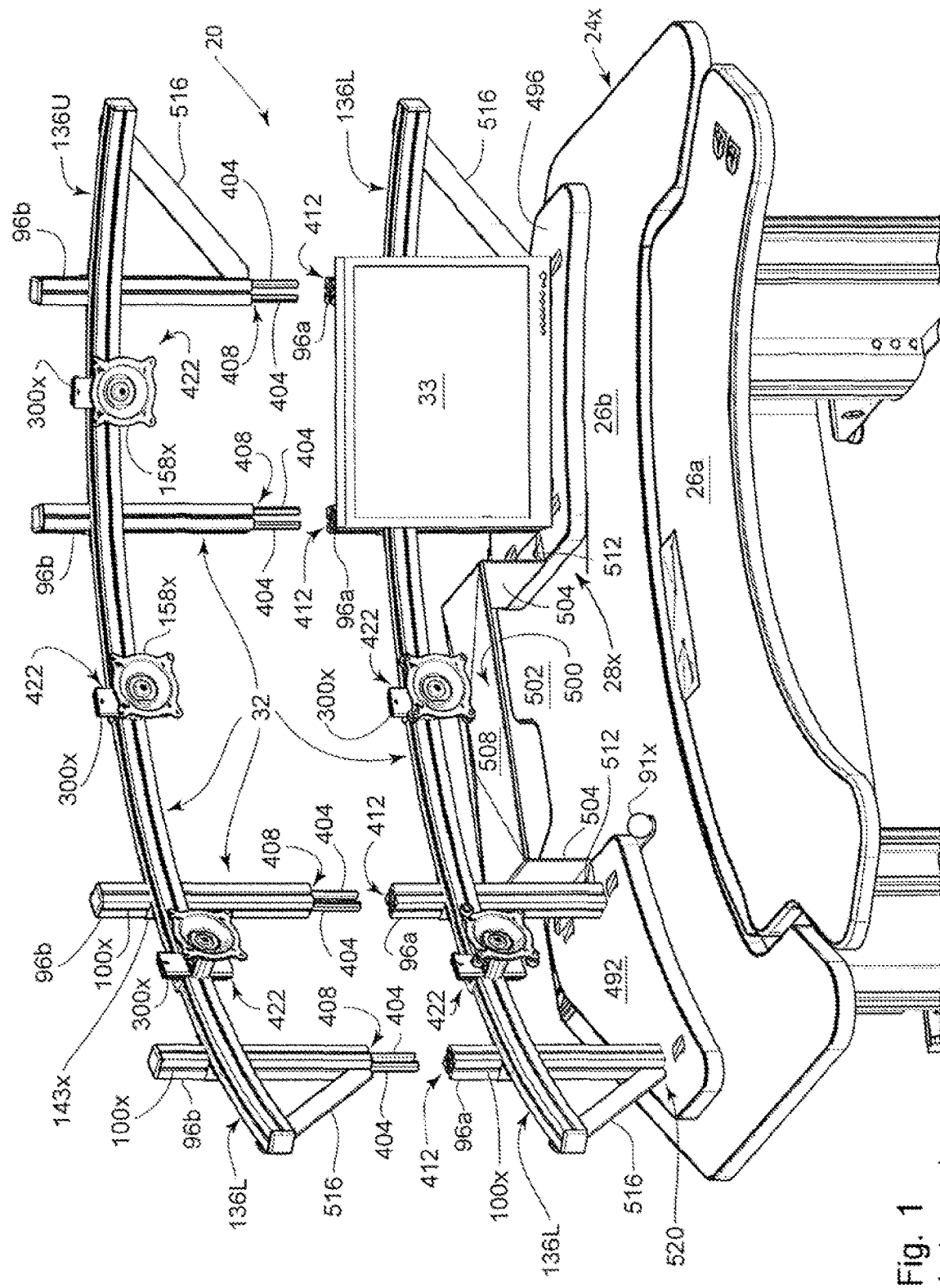
FIG. 1 illustrates an embodiment of a prior art monitor mounting system 20.

FIG. 1 illustrates an embodiment of the prior art monitor mounting system 20 disclosed by the '599 patent. The monitor mounting system 20 is installed at a workstation 24x having a curved desktop that is split into forward desktop or work surface 26a and rear desktop or work surface 26b. The monitor mounting system 20 includes a platform 28x upon which a monitor mounting rack ("rack" or "frame") 32 is mounted; in turn, the rack 32 has monitors 33 mounted thereon. In the embodiment illustrated in FIG. 1, a hand grip 91x is provided for moving the platform 28x, as well as the attached rack 32 and monitors 33.

The rack 32 includes vertical posts 96, the lower ends of which are secured to the platform 28x for conveying the weight of, e.g., the monitors 33 to the platform 28x. In the embodiment illustrated in FIG. 1, each of the posts 96 has a substantially square cross-section, with each side of the square having a recess 100x that extends the length of the post 96. Vertical posts 96 are interconnected to horizontal rails 136 to form the rack 32 by means of post fasteners 143x. Monitor mount plates 158x attach to the back of each monitor 33 for securing the monitor to a monitor mounting assembly, and in turn to the rack 32. Vertical adjustment plates 300x are provided as part of attachment assemblies 422 to allow a user to align the display center points of monitors 33.

Figure 2:
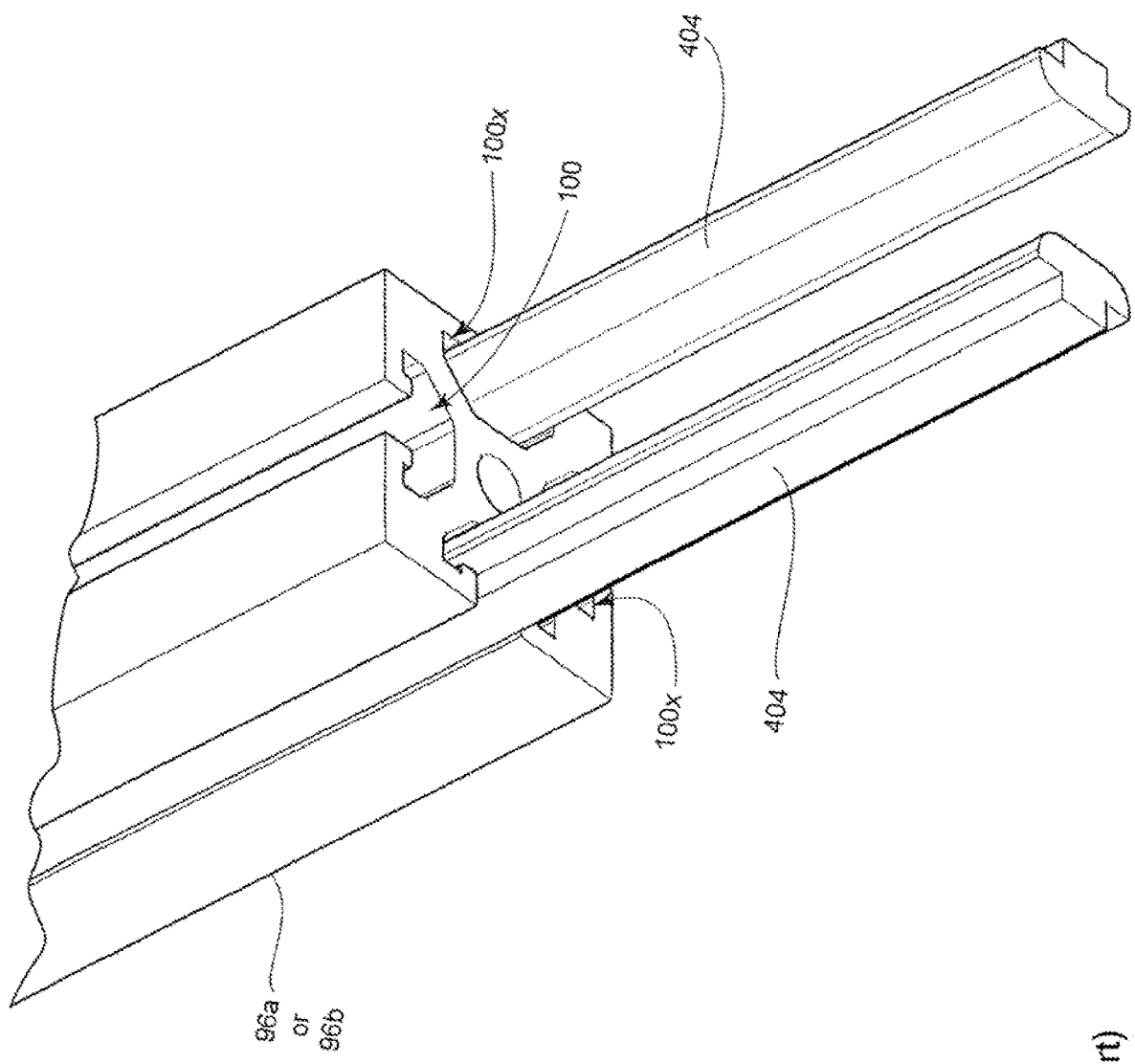
FIG. 2 illustrates rigid connectors 404 used for connecting a post segment 96*a* to a post segment 96*b* in the prior art monitor mounting system 20 of FIG. 1.

In one embodiment of the prior art monitor mounting system 20 of FIG. 1, the number of horizontal rails 136 necessary to form the rack 32 may be reduced by using a plurality of properly spaced vertical posts 96 with orientable subassemblies attached to each post 96. This embodiment allows small amounts of horizontal adjustment using a mounting plate, such as an adjustment plate. Moreover, the height of each vertical post may be extended to allow two or more monitors to be vertically stacked thereon. In one embodiment, as shown in FIGS. 1 and 2, one or more posts 96 may be extended by providing rigid connectors 404 within at least one (and preferably a plurality) of the post recesses 100. FIG. 2 shows a pair of connectors 404 partially received within recesses on opposite sides of a post segment 96 (96a or 96b in FIG. 1), such recesses being labeled as 100x in FIGS. 1 and 2. Particularly, assuming it is desirable to extend each of one or more lower post segments 96a with a corresponding upper post segment 96b, then a pair of connectors 404 may be provided in corresponding aligned recesses 100 of the upper post segment and its corresponding lower post segment. Accordingly, when a pair of connectors 404 is provided in opposing recesses 100 of each of the one or more upper post segments 96b (as shown in FIG. 1) such that each connector is fixed within its recess, e.g., via a set screw, clamp, wedge or other securing mechanism (not shown), then each upper post segment 96b may be positioned so that its pair of connectors 404 slide into recesses 100 in corresponding opposite sides of one of the lower post segments 96a. Accordingly, once each of the lower ends 408 of the upper post segments 96b rests flush on a corresponding upper end 412 of a lower post segment 96a, the connectors 404 may be fixedly secured in their respective recesses 100 of their lower post segment 96a. Of course, other techniques for securing together upper and lower post segments 96b and 96a may be used. Particularly, the connectors 404 may be first provided in the recesses 100 of the lower post segments 96a, wherein the connectors 404 are fixed therein (or in one embodiment, not fixed, but instead, positioned therein so that the lower end of each connector 404 rests on a stop within each recess) so that each connector extends out the upper end 412 of its corresponding lower post segment. Subsequently, the upper post segments 96b are fitted onto the extending portions of the correctors 404. In another embodiment, a corresponding pair of lower and upper post segments may be secured together by providing an intermediary piece that snuggly fits about the perimeter of each the ends 408 and 412 to be coupled together, wherein the intermediary piece includes a stop or separation plate that is internal to the intermediary piece and rests on top of the end 412 and the end 408 rests thereon when the lower and upper post segments are coupled together. Note that the connectors 404 and/or the intermediary piece(s) may be made of steel or aluminum or an alloy thereof.

Referring to FIG. 2, where a more detailed view of a pair of connectors 404 provided in a post segment is shown, note that each connector may have a shape that substantially conforms to the interior of the recess 100 in which the connector is inserted so that there is close tolerance between the interior of the recesses and their inserted connectors. In one embodiment, such a tolerance may be between 0.01 and 0.05 inches, and the connectors may extend into each corresponding recess 100 of a lower and upper post segment at least 3 to 5 inches.

Referring again to FIG. 1, an embodiment of the platform 28x is shown wherein the platform 28x includes subplatforms 492 and 496 which may be connected to one another via an extended height bracket 500, wherein this bracket provides an interior storage space 502 underneath it (on the desktop 26b) for, e.g., equipment, informational materials, etc. that could not be stored (on the desktop 26b) under the reduced height offset of the platform 28x or the subplatforms 492, 496. The bracket 500 includes: (i) side walls 504 rising above the upper surfaces of the subplatforms 492 and 496 substantially at their edges, and (ii) a bracket top 508 extending between and attaching to each of the side walls 504. The side walls 504 attach to a corresponding one of the subplatforms 492 and 496 via one or more flanges 512 attached to the subplatform. In FIG. 1, a single flange 512 is attached to the upper side of each subplatform 492 and 496. However, such flanges 512 may be also: (i) attached to the lower side of one or more of the subplatforms 492 and 496, (ii) embedded with the vertical edge of one or more of the subplatforms, or (iii) a pair of flanges 512 may be provided for sandwiching a portion of a subplatform therebetween such that a first flange of the pair attaches to the upper side of the subplatform and a second flange of the pair attaches to a lower side of the subplatform. The flanges 512 may be attached to their respective subplatforms 492 and 496 by screws, bolts, locking fasteners, clamps, etc. In one embodiment, the bracket 500 is attachable and detachable from the subplatforms 492 and 496 so that, e.g., the subplatforms and the bracket can be shipped disassembled and assembled on-site. A reinforcement for reinforcing the bracket 500 may include: (i) a substantially horizontal bar attached at its ends to the side walls 504 (not shown), (ii) triangular reinforcements for the corners formed by each of the side walls and the bracket top 508 (not shown), and/or (iii) other reinforcing members, e.g., built-in to the side walls or the bracket top. When the bracket 500 is attached to the subplatforms, the subplatforms 492 and 496 are movable as a single unit over the desktop 26b. Particularly, rollers and/or alignment guides may be provided for supporting the subplatforms 492 and 496 above the desktop 26a and moveable thereon. Accordingly, the subplatforms 492 and 496 may be offset above the desktop 26b by approximately, e.g., 0.5 to 1.5 inches.

In one embodiment, the side walls 504 of the bracket 500 have a vertical extent of approximately 5 to 12 inches, and more preferably 7 to 9 inches. Thus, storage height of the space 502 between: (i) the bracket top 508, and (ii) the desktop 26b may be approximately 6.5 to 14 inches, and more preferably 8.5 to 12 inches. Additionally, the bracket 500 may have a horizontal extent of between approximately 12 inches and 24 inches. Accordingly, the storage space is at least acceptable for storing, e.g., a 5-inch-high stack of manuals, equipment such as audio speakers or a webcam, and/or user personal effects without interfering with the movement of the platform 28x.

As shown in FIG. 1, the subplatforms 492 and 496 may be of different sizes and shapes depending, e.g., on the shape and size of the desktop 26b, the functional utilization of the top surfaces of the subplatforms. In the present figure, a monitor 33 is provided on the subplatform 496, and the subplatforms 492 and 496 are used as an attachment/support for rail reinforcements 516 to provide additional support to, e.g., the free ends of the lower most rail 136 (identified as 136L in FIG. 1). Particularly, the lower end 520 of each such reinforcement 516 may be secured to/within the subplatform on which it is supported via, e.g., the reinforcement being received with a metal slot (not shown) provided in the upper surface of the subplatform, and/or having a flange (also not shown) that is secured to the upper surface of the subplatform.

FIG. 1 also shows a hand grip 91x for adjusting the distance between a workstation user and the monitors 33 that can be attached to the attachment assemblies 422. The hand grip 91x may be moveable relative to the subplatform 492 to which it is attached so that in a first position (e.g., the position shown in FIG. 1) the platform 28x is moveable along the desktop 26b, and in a second position (e.g., rotated counterclockwise), locks the platform 28x in its location. Such locking may be performed by, e.g., preventing one or more of rollers 34 from rolling, or causing a pad located between the subplatform 492 and the desktop 26b to firmly contact the desktop 26b and thereby prevent movement of the platform 28x, or a lever or stop (not shown) that interferes with the sliding of a rail or railing.

FIG. 1 also includes partial displays of a post fastener 143x, wherein each such fastener 143x is generally "U" shaped for wrapping around its post segment 96a or 96b such that the opening of the "U" opens toward the front of the workstation 24x.

Although the monitor mounting system 20 of the '599 patent as illustrated in FIGS. 1 and 2 is adequate to mount many monitors, it also carries several potential drawbacks. By way of non-limiting example, it may frequently be the case that a user may wish to have a substantially larger number of monitors, e.g. four or more, in a lower row than in an upper row, e.g. one or two; in such a case, the top row of the frame structure protrudes horizontally beyond the upper row of monitors and creates an aesthetically displeasing, "industrial" appearance. In addition, the substantial forces exerted on the lower portion of the frame structure by the weight of monitors, especially larger monitors, may cause the lower portion to twist or bend undesirably, which may force the lower row of monitors out of a desired position or even cause damage to the frame structure.

Figure 3:
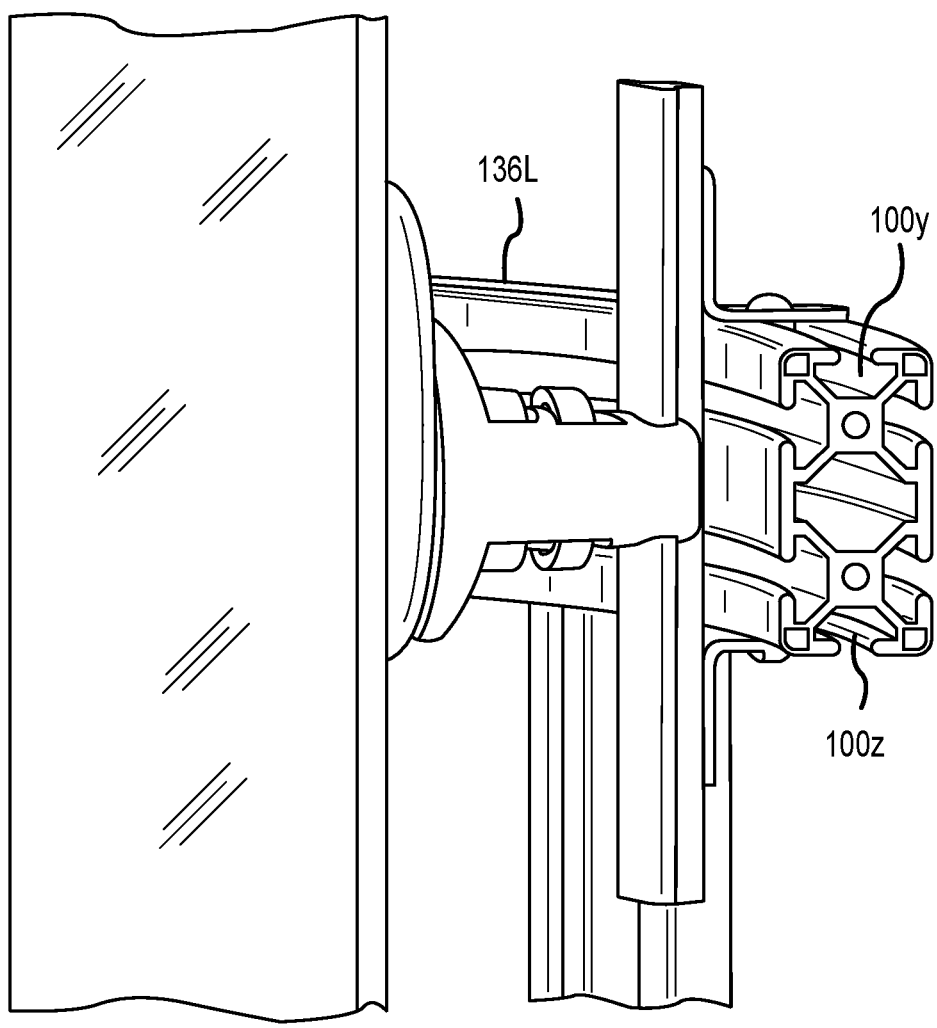
FIG. 3 illustrates a lower rail 136L of a monitor mounting system 20 according to the present invention.

Referring now to FIG. 3, a lower rail 136L of a monitor mounting system 20 according to the present invention is illustrated. In this embodiment, the height of the lower rail 136L (about 80 mm) is doubled compared to the height of the lower rail 136L in the prior art embodiment illustrated in FIG. 1 (about 40 mm). The increased height of the lower rail 136L provides significant additional strength to the monitor mounting system 20 illustrated in FIG. 3, and reduces the susceptibility of the lower rail 136L to twisting due to the weight of monitors affixed thereto. In the embodiment illustrated in FIG. 3, the lower rail 136L is formed of a "double-high" (40 mm×80 mm) extruded aluminum alloy beam, as opposed to the "standard" (40 mm×40 mm) extruded aluminum alloy beam of the prior art rail of FIG. 1, and has both upper 100y and lower 100z channels for receiving other components of the monitor mounting system 20. Extruded aluminum alloy beam framing systems are well-known in the art and are offered commercially by any number of manufacturers, including, by way of non-limiting example, 80/20 Inc.

Figure 4:
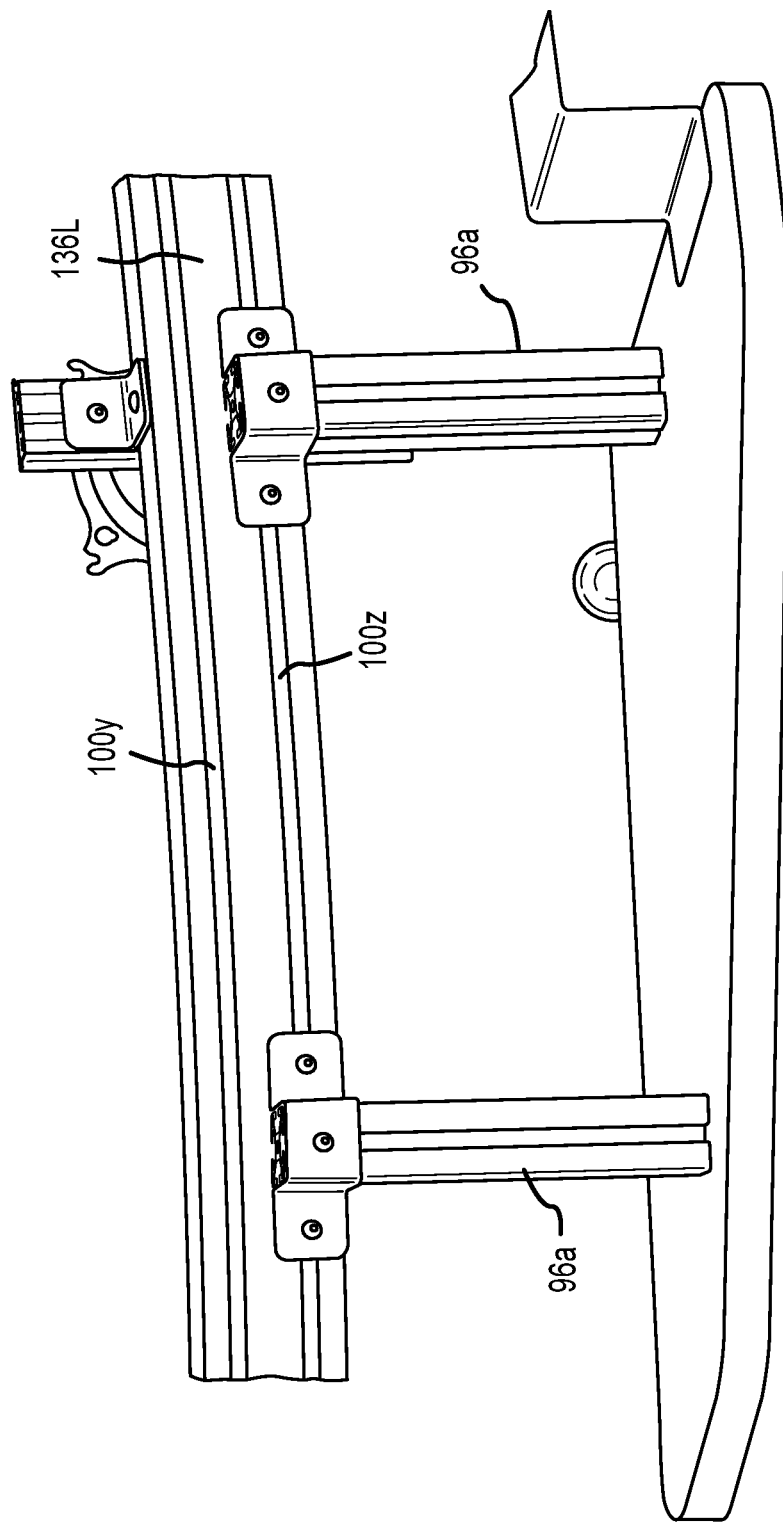
FIG. 4 illustrates lower vertical post segments 96*a* of a monitor mounting system 20 according to the present invention.

Referring now to FIG. 4, lower vertical post segments 96a of a monitor mounting system 20 according to the present invention are illustrated. In this embodiment, the height of the lower vertical post segments 96a (about 8.75") is reduced compared to the height of lower vertical post segments 96a in the prior art embodiment illustrated in FIG. 1 (about 15"). The shortened lower vertical post segments now attach to the bottom channel 100z of the 40-mm×80 mm lower rail 136L.

Figure 5A:
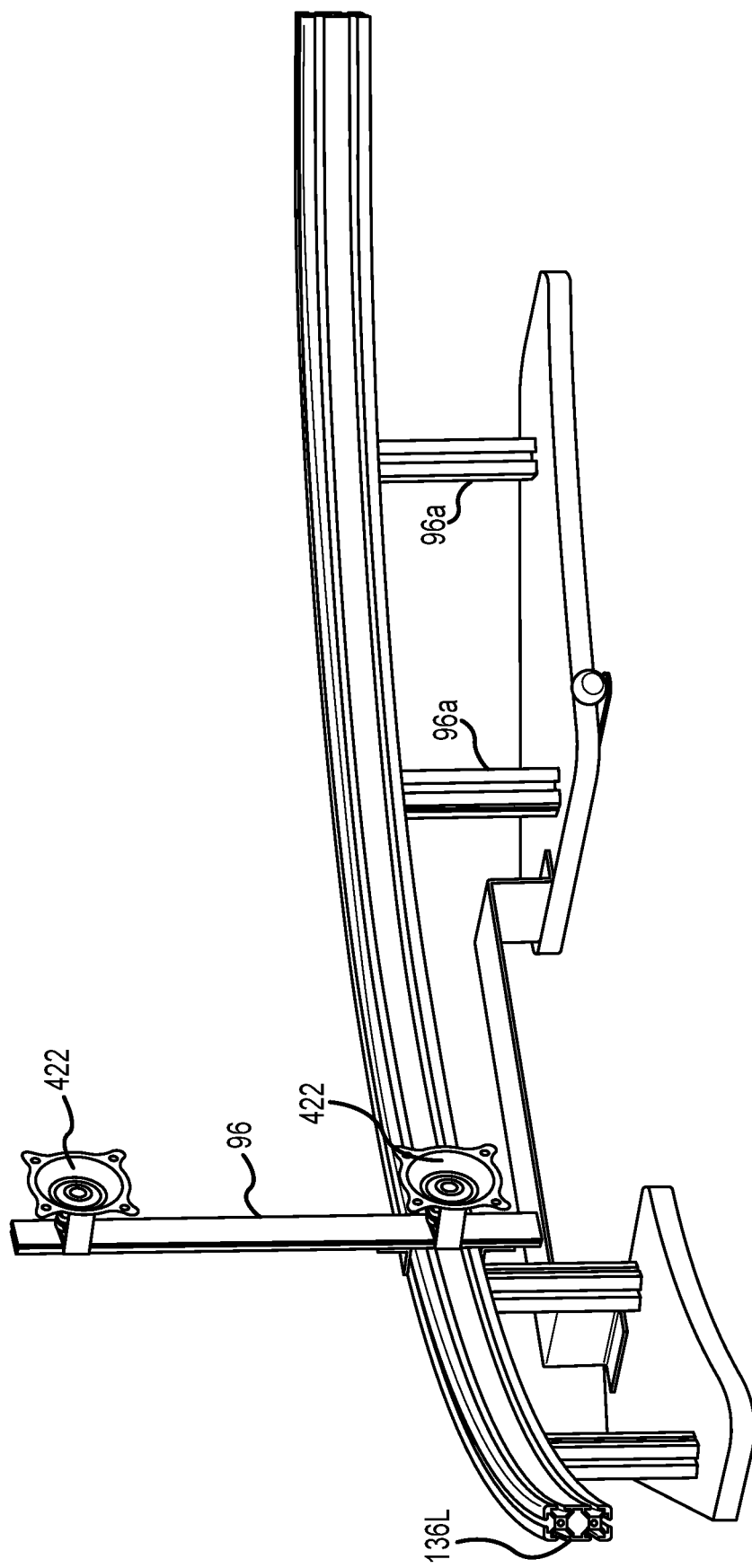
FIGS. 5A and 5B illustrate a lower rail 136L and vertical post segment 96 of a monitor mounting system 20 according to the present invention, without and with attached monitors 33, respectively.
Figure 5B:
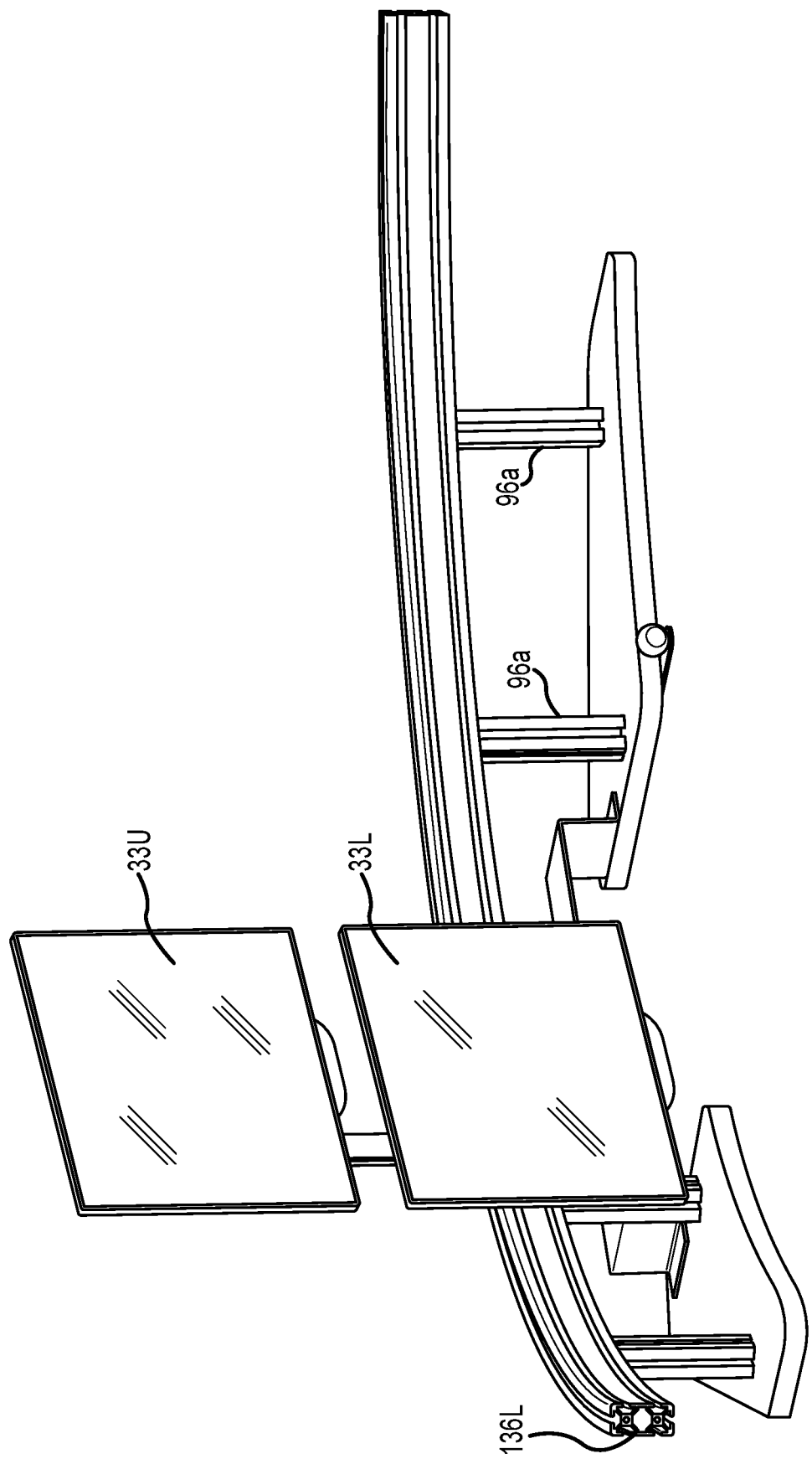
Figure 8:
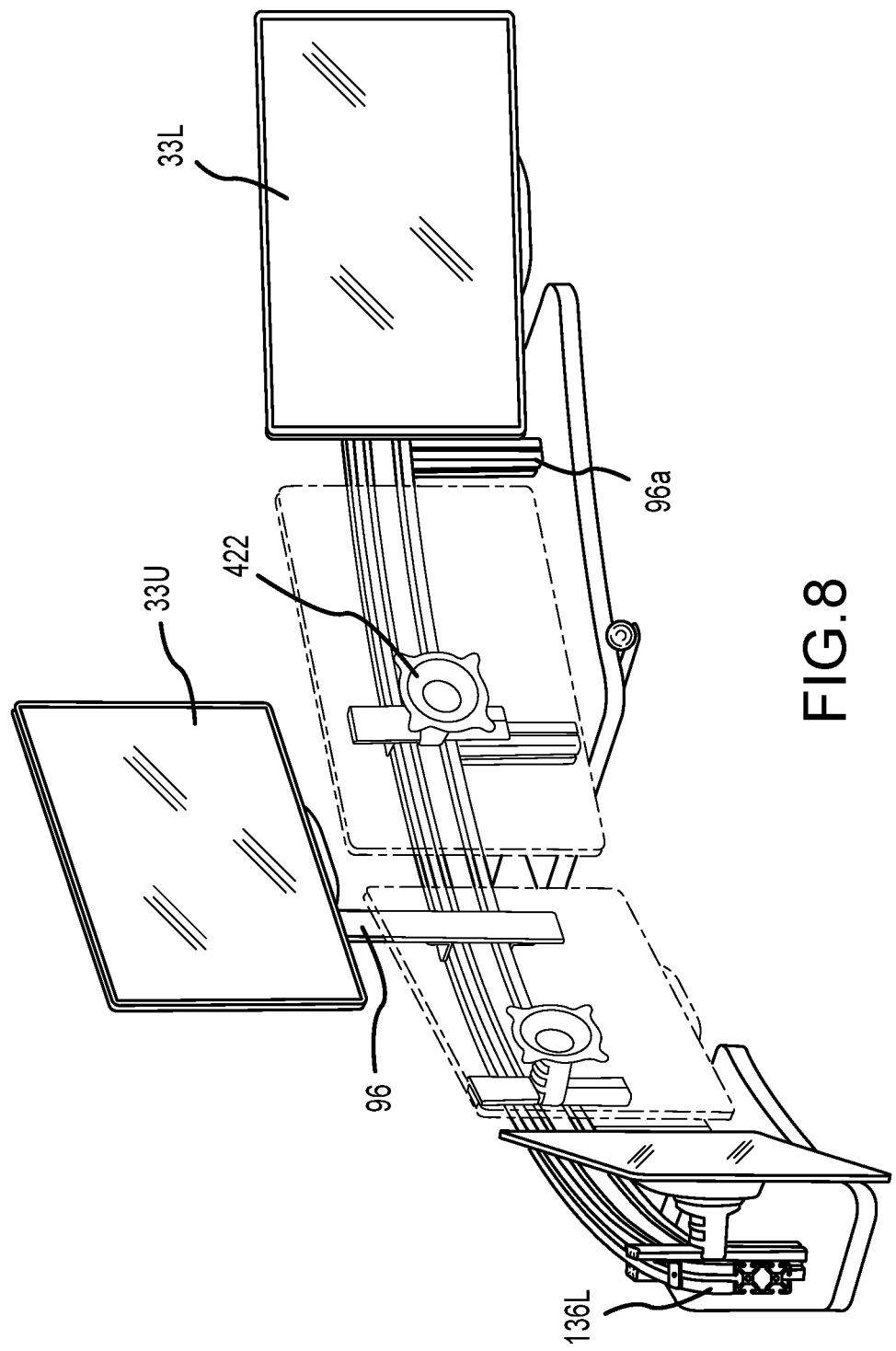
FIG. 8 illustrates a 20" vertical post segment 96 provided with only a single attachment assembly 422 at a height of about 17.5" according to the present invention.

Referring now to FIGS. 5A and 5B, a lower rail 136L and vertical post segment 96 of a monitor mounting system 20 according to the present invention are illustrated without (FIG. 5A) and with (FIG. 5B) attached monitors 33. In this embodiment, at least one taller vertical post segment 96, having a height of about 20", is provided in addition to or instead of one or more of the shorter (8.75") lower vertical post segments 96a illustrated in FIG. 4. The taller vertical post segment 96 of FIGS. 5A and 5B allow two attachment assemblies 422 to be affixed, one at a height of about 8.75" in conjunction with lower rail 136L and one at a height of about 17.5", to allow for two rows of monitors 33. As illustrated in FIG. 5B, the 20" vertical post segment allows a monitor 33U of the upper row to be located directly above a monitor 33L of the lower row. Alternatively, however, where it is desirable for an upper row monitor 33U to be positioned horizontally such that there is no monitor directly below, a 20" vertical post segment 96 may be provided with only a single attachment assembly 422 at a height of about 17.5"; such an embodiment is illustrated in FIG. 8. Taller vertical post segments 96 allow a second row of monitors to be mounted on the rack 32 with or without an upper rail 136U; as a result, the upper portion of the rack 32 need not extend horizontally beyond the width of the upper row of monitors, creating an improved aesthetic as compared to the prior art embodiment illustrated in FIG. 1.

Figure 6:
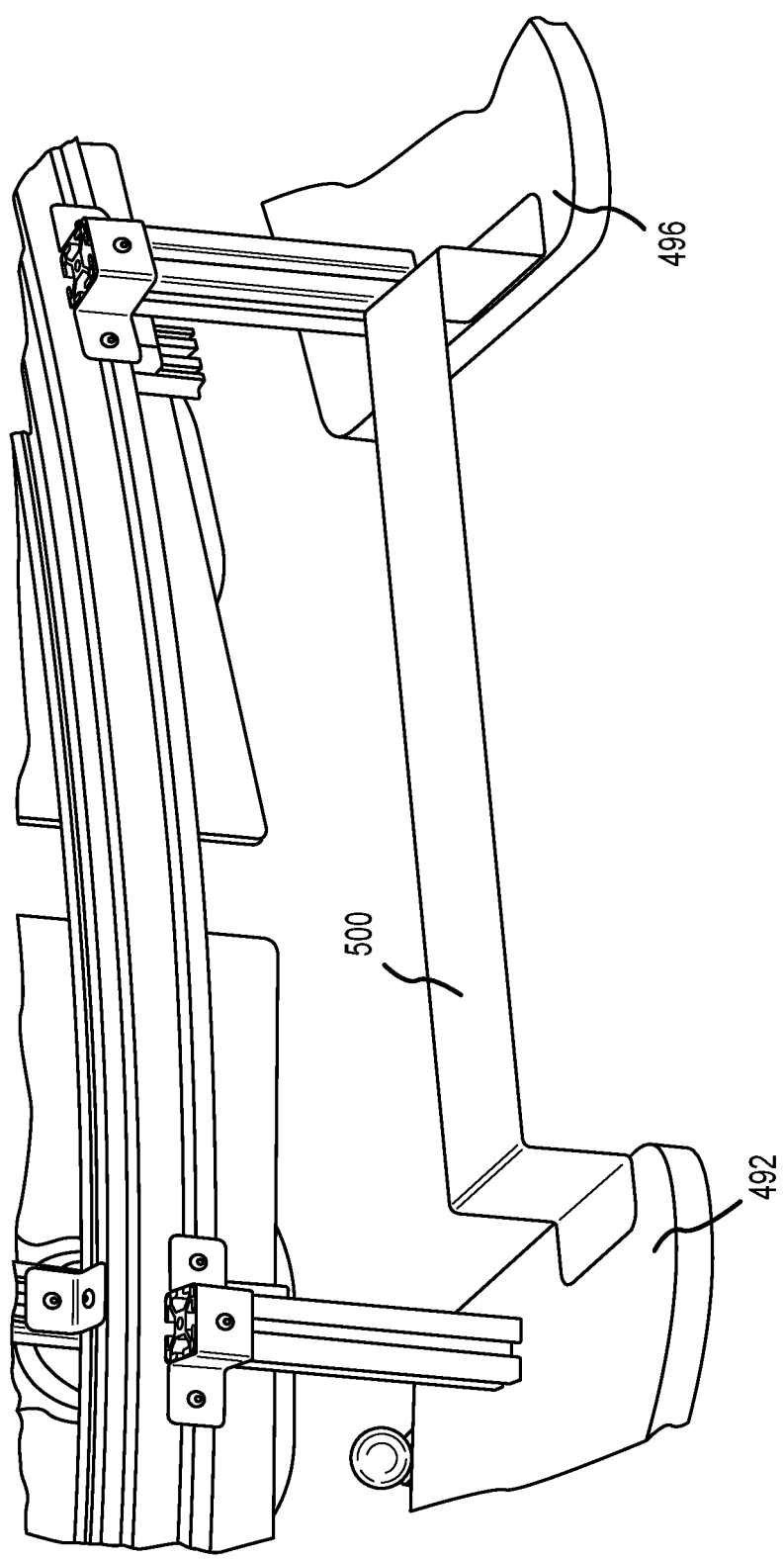
FIG. 6 illustrates a bracket 500 for connecting subplatforms 492 and 496 of a monitor mounting system 20 according to the present invention.

Referring now to FIG. 6, a bracket 500 for connecting subplatforms 492 and 496 of a monitor mounting system 20 according to the present invention is illustrated. In this embodiment, the height and depth of the bracket 500 are reduced by about 1.75" and about 3.4", respectively, and the width of the bracket is increased by about 1.9", compared to the bracket 500 of the prior art embodiment illustrated in FIG. 1.

Figure 7:
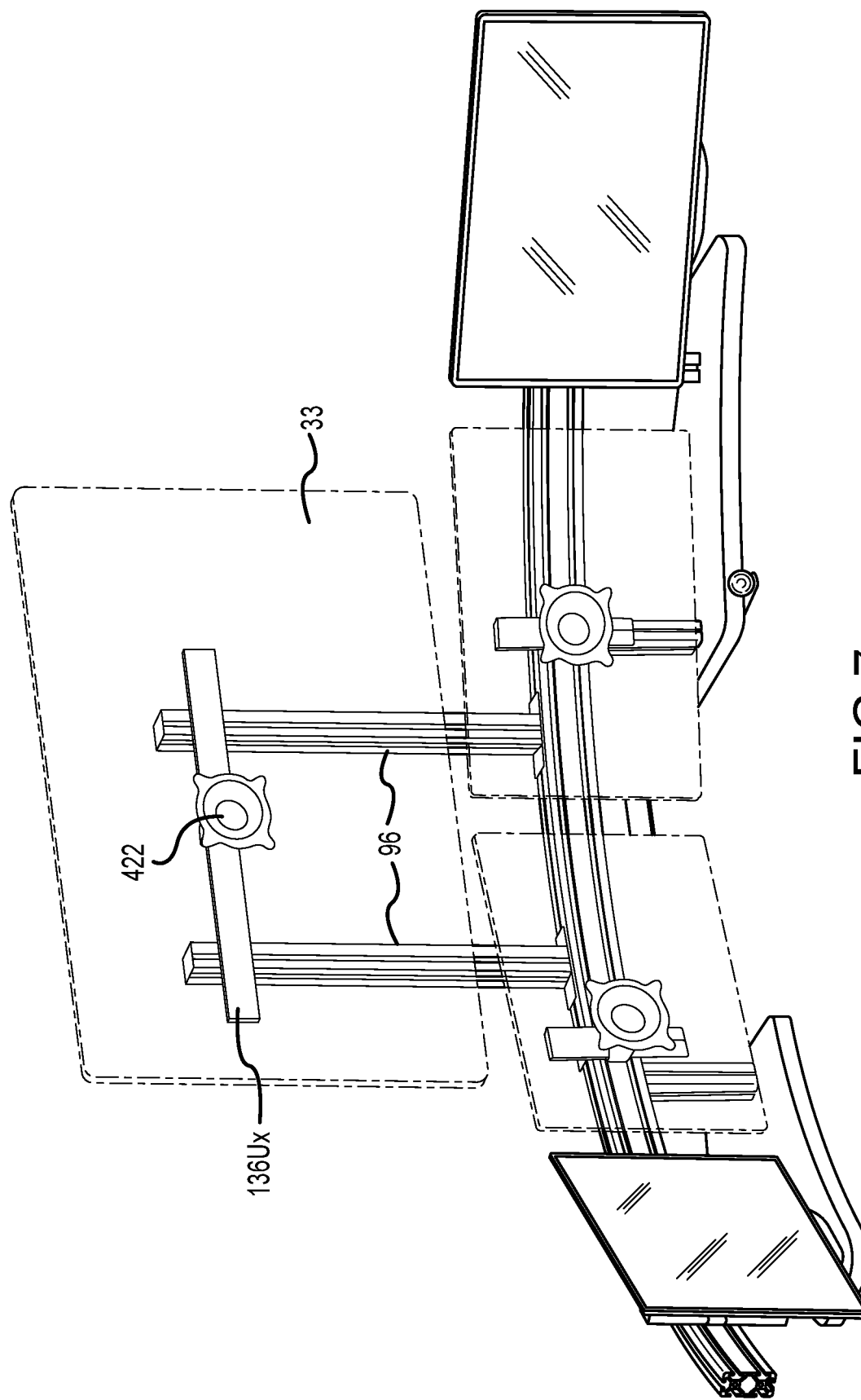
FIG. 7 illustrates a portion of a monitor mounting system 20 comprising a particularly large monitor 33 according to the present invention.

Referring now to FIG. 7, a portion of a monitor mounting system 20 comprising a particularly large monitor 33 according to the present invention is illustrated. In this embodiment, two taller vertical post segments 96 support a horizontal monitor support beam 136Ux, which in turn supports an attachment assembly 422 for the larger monitor 33. The arrangement illustrated in FIG. 7 allows for a larger monitor 33 to be securely mounted as part of the upper row of monitors without twisting or damaging the frame 32.

Monitor mounting systems of the present invention may be particularly advantageous when the forward desktop or work surface 26a is higher than the rear desktop or work surface 26b. In such an embodiment, one subplatform 492, 496, to which shorter vertical post segments 96a are interconnected, may be disposed on the forward desktop 26a, while another subplatform 492,496, to which taller vertical post segments 96 are interconnected, may be disposed on the rear desktop 26*b*. This arrangement may allow for a vertical distance between the top row of monitors and the bottom row of monitors to be greatly reduced or even eliminated, which may be desirable in many applications for improving the visibility of the upper row of monitors and reducing the eye strain of a user. Such a monitor mounting system can accommodate a significant difference in the levels of the forward desktop 26*a* and the rear desktop 26*b*, such as, by way of non-limiting example, a difference of as much as about five inches.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their application or uses of the invention. The present disclosure further contemplates methods for assembling, distributing and/or manufacturing the monitor mounting system 20.

The invention claimed is:

1. A computer monitor mounting apparatus for mounting a plurality of monitors, comprising:
    a plurality of monitors;
    a platform having at least one guide attached thereto, wherein the guide also contacts an upwardly facing surface so that the guide maintains the platform on a predetermined path along the upwardly facing surface positioned below the platform when the platform moves on the upwardly facing surface, the platform including a plurality of spaced apart subplatforms, wherein the at least one guide (i) includes portions that move relative to one another within a space between the upwardly facing surface and the subplatforms, (ii) includes a portion that is fixedly attached to the upward facing surface, and (iii) telescopes during movement of the monitor mounting apparatus over the upwardly facing surface;
    a frame extending above the platform and attached thereto for moving with the platform when the platform moves along the predetermined path, the frame providing mountings supporting the plurality of the monitors above the platform;
    one or more wheels or rollers for rolling the platform on the upwardly facing surface, wherein the wheels or rollers move over the upwardly facing surface for at least a portion of a travel extent for the wheels or rollers, each wheel or roller having an extent that rotatably contacts the upwardly facing surface when the platform moves along the predetermined path; and
    a connector for connecting the subplatforms together, wherein the connector provides an interior that is: (i) between at least two of the subplatforms, and (ii) between an upper boundary of the interior and the upwardly facing surface,
    wherein the interior provides storage space on the upwardly facing surface, the interior having a height above the upwardly facing surface of at least three times a height of the space between the upwardly facing surface and the subplatforms, wherein the interior is effective for storing one or more items without interfering with movement of the platform on the predetermined path,
    wherein the frame comprises a substantially horizontal lower rail and first and second vertical post segments, the substantially horizontal lower rail having a depth of about 40 millimeters and a height of about 80 millimeters, the first vertical post segment having a height of about 8.75" and interconnecting into a bottom channel of the substantially horizontal lower rail, the second vertical post segment interconnecting into a bottom channel of the substantially horizontal lower rail, said second vertical post segment having a height of about 20" and a first mounting affixed thereto, the first mounting supporting one of the plurality of monitors at a height of about 17.5" above the platform.

2. The apparatus of claim 1, wherein the at least one guide retracts and extends during movement of the monitor mounting apparatus over the upwardly facing surface.

3. The apparatus of claim 1, wherein the platform has a range of movement along the predetermined path of at least 10 inches.

4. The apparatus of claim 1, wherein the platform has a range of movement along the predetermined path of less than 20 inches.

5. The apparatus of claim 1, wherein at least one of the mountings includes a predetermined monitor mount hole pattern.

6. The apparatus of claim 1, wherein for each monitor of at least some of the monitors, a corresponding one of the mountings attaches the monitor to a horizontal rail of the frame, wherein the corresponding mounting provides a horizontal range of rotation of at least 60 degrees for the monitor.

7. The apparatus of claim 1, wherein the monitors are provided along an arc of the frame such that for a corresponding display for each of at least two-thirds of the monitors, and for at least one position facing the displays, a distance between:
    (i) the at least one position, and
    (ii) a center of the corresponding display,
    varies by no more than about 5% from a distance between the at least one position and a center of the corresponding display for each of the other monitors of the at least two-thirds of the monitors.

8. The apparatus of claim 1, wherein the frame includes at least one substantially horizontal rail wherein at least one of the mountings is horizontally slidable along the rail.

9. The apparatus of claim 1, wherein the substantially horizontal lower rail supports at least one of the mountings thereon, and further including an adjustment plate for providing a vertical adjustment of the mounting on the rail, the plate secured between the rail and the at least one mounting, the plate secured separately to each of the rail and the at least one mounting.

10. The apparatus of claim 1, wherein at least one of the mountings includes a first rotational member, wherein when a corresponding one of the monitors is attached to the at least one mounting, the first rotational member provides a first rotation range for the corresponding monitor.

11. The apparatus of claim 1, wherein the upwardly facing surface includes a substantially horizontal desktop.

12. The apparatus of claim 1, wherein at least the substantially horizontal lower rail and the first vertical post segment are extruded aluminum alloy beam components.

13. The apparatus of claim 1, wherein the second vertical post segment has a second mounting affixed thereto, the second mounting supporting a monitor at a height of about 8.75" above the platform.

14. The apparatus of claim 1, wherein the frame further comprises a third vertical post segment having a height of about 20" and a horizontal monitor support beam extending between the second and third vertical post segments, the horizontal monitor support beam having a mounting supporting a monitor affixed thereto.

* * * * *